US009732497B2

(12) United States Patent
Miyata et al.

(10) Patent No.: US 9,732,497 B2
(45) Date of Patent: Aug. 15, 2017

(54) TRAVELING DEVICE AND WORKING MACHINE

(71) Applicant: Caterpillar SARL, Geneva (CH)

(72) Inventors: Kazuhisa Miyata, Tokyo (JP);
Michihiro Izawa, Tokyo (JP);
Masamitsu Imagawa, Hyogo (JP);
Shuji Kidoguchi, Tokyo (JP)

(73) Assignee: Carterpillar SARL, Geneva (CH)

( * ) Notice: Subject to any disclaimer, the term of this patent is extended or adjusted under 35 U.S.C. 154(b) by 4 days.

(21) Appl. No.: 15/037,213

(22) PCT Filed: Nov. 24, 2014

(86) PCT No.: PCT/EP2014/075396
§ 371 (c)(1),
(2) Date: May 17, 2016

(87) PCT Pub. No.: WO2015/078810
PCT Pub. Date: Jun. 4, 2015

(65) Prior Publication Data
US 2016/0281325 A1 Sep. 29, 2016

(30) Foreign Application Priority Data
Nov. 28, 2013 (JP) ................... 2013-246537

(51) Int. Cl.
*E02F 9/22* (2006.01)
*E02F 9/02* (2006.01)
(Continued)

(52) U.S. Cl.
CPC .............. *E02F 9/02* (2013.01); *B60K 7/0023* (2013.01); *B62D 55/06* (2013.01); *B62D 55/08* (2013.01);
(Continued)

(58) Field of Classification Search
CPC . B62D 55/06; B62D 55/10; E02F 9/00; E02F 9/22; B60Y 2200/25
See application file for complete search history.

(56) References Cited

U.S. PATENT DOCUMENTS 5,950,748 A 9/1999 Matsumoto et al.
7,007,416 B2 * 3/2006 Yonetake ................ E02F 3/325
37/466

(Continued)

FOREIGN PATENT DOCUMENTS

JP 63-086168 U 6/1988
JP 01-037002 Y2 11/1989
(Continued)

OTHER PUBLICATIONS

European Patent Office, International Search Report in International Patent Application No. PCT/EP2014/075396, Jan. 26, 2016, 2 pp.
(Continued)

*Primary Examiner* — Tony Winner
*Assistant Examiner* — Gabriela C Craciun
(74) *Attorney, Agent, or Firm* — Leydig, Voit & Mayer, Ltd.

(57) ABSTRACT

A travelling frame of a travelling device positioned between a center frame and a travelling motor attachment portion includes an upper plate extended toward the center side of the vehicle to form an extended portion. A long hole into which travelling motor hydraulic piping is inserted is formed in the upper plate along the extended portion. The travelling motor hydraulic piping extends from a lead-out hole opened in an end plate of the center frame, through the long hole of the upper plate and a long hole opened in an end plate, and inserted into the travelling motor attachment portion.

12 Claims, 3 Drawing Sheets

(51) Int. Cl.

| | | |
|---|---|---|
| *B62D 55/06* | (2006.01) | |
| *B62D 55/08* | (2006.01) | |
| *B62D 55/125* | (2006.01) | |
| *E02F 3/32* | (2006.01) | |
| *E02F 9/08* | (2006.01) | |
| *B60K 7/00* | (2006.01) | |
| *B60K 17/10* | (2006.01) | |

(52) U.S. Cl.
CPC .............. *B62D 55/125* (2013.01); *E02F 3/32* (2013.01); *E02F 9/0808* (2013.01); *E02F 9/22* (2013.01); *E02F 9/2275* (2013.01); *B60K 7/0015* (2013.01); *B60K 17/10* (2013.01); *B60Y 2200/25* (2013.01); *B60Y 2200/412* (2013.01)

(56) References Cited

U.S. PATENT DOCUMENTS

| | | | |
|---|---|---|---|
| 2007/0080236 A1* | 4/2007 | Betz | B60K 6/46 237/12.1 |
| 2009/0284000 A1* | 11/2009 | Takano | B62D 21/186 280/794 |
| 2011/0077825 A1* | 3/2011 | Sano | B60K 6/48 701/42 |
| 2011/0093150 A1* | 4/2011 | Yanagisawa | B60W 20/13 701/22 |
| 2012/0109472 A1* | 5/2012 | Yanagisawa | B60K 6/46 701/50 |
| 2012/0138373 A1* | 6/2012 | Jackson | B62D 55/125 180/9.62 |
| 2012/0161679 A1* | 6/2012 | Goldammer | B60L 1/003 318/400.3 |
| 2013/0220720 A1* | 8/2013 | Iizuka | B60K 5/12 180/65.26 |
| 2016/0208459 A1* | 7/2016 | Takahashi | E02F 9/2228 |
| 2016/0265192 A1* | 9/2016 | Kanou | E02F 9/0866 |

FOREIGN PATENT DOCUMENTS

| | | | | |
|---|---|---|---|---|
| JP | 07-238569 A | | 9/1995 | |
| JP | 2002-339402 A | | 11/2002 | |
| JP | 2004-060210 A | | 2/2004 | |
| JP | 2004060210 | * | 2/2004 | ............... E02F 9/00 |
| JP | 2004-116197 A | | 4/2004 | |
| JP | 2006-069492 A | | 3/2006 | |
| JP | 2006069492 | * | 3/2006 | ............. B60K 17/10 |
| JP | 2006-219871 A | | 8/2006 | |
| JP | 2006-291693 A | | 10/2006 | |
| JP | 2006291693 | * | 10/2006 | ............. B62D 55/10 |
| JP | 2007-231670 A | | 9/2007 | |
| JP | 2009-191555 A | | 8/2009 | |
| JP | 2009-249922 A | | 10/2009 | |
| JP | 2012-132241 A | | 7/2012 | |

OTHER PUBLICATIONS

European Patent Office, Written Opinion in International Patent Application No. PCT/EP2014/075396, Jan. 26, 2016, 4 pp.

* cited by examiner (a) (b)

TRAVELING DEVICE AND WORKING MACHINE

CROSS-REFERENCE TO RELATED APPLICATIONS

This application is a national phase application of International Patent Application No. PCT/EP2014/075396, filed Nov. 24, 2014, which claims priority to Japanese Patent Application No. 2013-246537, filed Nov. 28, 2013, both of which are incorporated by reference herein in their entireties for all purposes.

TECHNICAL FIELD

The present invention relates to a crawler type traveling device and a working machine including the traveling device.

BACKGROUND ART

As shown in FIG. 6, a traveling device 1 provided at a lower portion of a hydraulic shovel is configured such that: upper surface plates 4 of travel frames 3 for attaching crawler belts are integrally provided on both left and right sides of a center frame 2 positioned at a vehicle center; a travel motor attachment unit 5 is integrally provided on one end side of the travel frame 3; and the crawler belt (not shown) attached along the travel frame 3 is driven to rotate by a crawler belt driving unit (not shown) including a hydraulic travel motor attached to the travel motor attachment unit 5, a reducer, and a sprocket. A travel motor hydraulic pipe 6 is arranged from the center frame 2 to the hydraulic travel motor in the travel motor attachment unit 5 through an opening in an inner side surface of the travel frame 3.

In such a traveling device 1 at the lower portion of the hydraulic shovel, the travel motor hydraulic pipe 6, arranged from the center frame 2 to the travel frame 3, might be damaged by colliding with an obstacle such as a rock during an excavation operation.

In view of this problem, conventional configurations where a piping cover that covers the travel motor hydraulic pipe 6 to prevent the travel motor hydraulic pipe 6 from being damaged have been known (see, for example, Patent Documents 1 and 2).

Furthermore, there are following configurations (see, for example, Patent Documents 3 to 5), as hydraulic piping protecting means other than the piping cover. Specifically, a hose insertion space for the travel motor hydraulic pipe is continuously arranged from an inside of the center frame 2 to an inside of the travel frame 3, in the traveling device 1. The travel motor hydraulic pipe is disposed through the hose insertion space in the frame.

[Patent Document 1] Japanese Utility Model Application Laid-open No. S63-086168
[Patent Document 2] Japanese Patent Application Laid-open No. 2006-219871
[Patent Document 3] Japanese Patent Application Laid-open No. 2002-339402
[Patent Document 4] Japanese Patent Application Laid-open No. 2004-060210
[Patent Document 5] Japanese Patent Application Laid-open No. 2009-191555

However, the piping covers described in Patent Documents 1 and 2 might be damaged or deform by colliding with a large obstacle. This might lead to damage on the travel motor hydraulic pipe and a problem regarding a vehicle outer shape.

Specifically, Patent Document 1 discloses what is known as a widening type (variable gauge type) traveling device in which a gap between left and right travel frames can be widened and narrowed. In such a device, the travel motor hydraulic pipe is provided with extra length, so as to be adaptable to both the widened and the narrowed states. Thus, in the narrowed state, a space for bending the extra portion of the pipe is required. Thus, the piping cover needs to have a size large enough to accept the extra length of the bent pipes, and thus has larger chance of colliding with the obstacle. Therefore, the piping cover is likely to be damaged and deform, and the travel motor hydraulic pipe in the cover might also be damaged.

Patent Documents 3 to 5 disclose the configurations where the travel motor hydraulic pipe is disposed through the hose insertion space arranged from the inside of the center frame to the inside of the travel frame. The configurations can prevent the travel motor hydraulic pipe from being damaged, but have a problem that an operation for assembling the hydraulic pipe is difficult to perform. In an attempt to solve this problem, for example, further problems arise. Specifically, the configuration in Patent Document 5 requires structurally difficult changes such as forming hole a large enough to allow a hand to be put into the hose insertion space, and providing a pipe guide surface in the hose insertion space.

DISCLOSURE OF THE INVENTION

The present invention is made in view of these points, and an object of the present invention is to provide a traveling device that can reduce the risk that the travel motor hydraulic pipe and the piping cover collide with the obstacle, and enable the operation of assembling the travel motor hydraulic pipe to be easily performed, and to a working machine including the traveling device.

The present invention according to claim 1 is a traveling device including: a center frame positioned at a vehicle center; a travel frame including an upper surface plate integrally provided on a lower side of the center frame; a crawler belt attached along the travel frame; a travel motor attachment unit integrally provided on one end side of the travel frame; a crawler belt driving unit that drives the crawler belt to rotate, by using a hydraulic travel motor attached to the travel motor attachment unit; and a travel motor hydraulic pipe arranged from the center frame to the hydraulic travel motor of the crawler belt driving unit through the travel frame, the traveling device further including: an expanded portion formed by expanding the upper surface plate of the travel frame positioned between the center frame and the travel motor attachment unit, toward the vehicle center side; and a long hole which is formed in the upper surface plate of the travel frame along the expanded portion and through which the travel motor hydraulic pipe is inserted.

The invention according to claim 2 is the traveling device according to claim 1 further including: a support attachment unit disposed around the long hole of the upper surface plate of the travel frame; and a piping support that is attached to the support attachment unit and holds the travel motor hydraulic pipe located in the long hole.

The invention according to claim 3 is the traveling device according to claim 1 or 2 further including: a cover attachment unit disposed around the long hole of the upper surface plate of the travel frame; and a piping cover that is attached from the center frame to the cover attachment unit on the travel frame and protects the travel motor hydraulic pipe.

The invention according to claim 4 is a working machine including: a vehicle; and a working apparatus mounted on the vehicle. The vehicle includes the traveling device according to any one of claims 1 to 3.

In the invention according to claim 1, the travel frame including the upper surface plate is integrally provided on the lower side of the center frame. The expanded portion is formed by expanding the upper surface plate of the travel frame, positioned between the center frame and the travel motor attachment unit integrally provided on the one end side of the travel frame, toward the side of the vehicle center. The long hole through which the travel motor hydraulic pipe is inserted is formed in the upper surface plate of the travel frame along the expanded portion. Thus, the minimum ground clearance of the travel motor hydraulic pipe routed into the travel frame from the center frame can be as high as the position of the upper surface plate of the travel frame. Thus, the risk that the travel motor hydraulic pipe collides with an obstacle such as a rock can be reduced. The traveling device can be provided that does not employ a configuration where the travel motor hydraulic pipe is disposed through a hose insertion space arranged from an inside of the center frame to an inside of the travel frame. In the traveling device, an operation for assembling the travel motor hydraulic pipe can be easily performed in an open space from the center frame to the long hole formed in the upper surface plate of the travel frame. The expanded portion is formed by expanding the upper surface plate of the travel frame toward the side of the vehicle center, and the long hole is formed in the upper surface plate of the travel frame, along the expanded portion. Thus, with the expanded portion, the long hole required for pipe routing can be secured without lowering the rigidity of the travel frame. The expanded portion can block the obstacle such as a rock protruding upward from below, and thus can protect the travel motor hydraulic pipe. With the long hole formed along the expanded portion positioned between the center frame and the travel motor attachment, unit, pipe routing enabling the travel motor hydraulic pipe to be smoothly routed from the center frame to the travel motor attachment unit can be secured.

In the invention according to claim 2, the long hole is formed in the upper surface plate along the expanded portion formed by expanding the upper surface plate of the travel frame toward the side of the vehicle center. Thus, the support attachment unit of the piping support that holds the travel motor hydraulic pipe located in the long hole can be positioned at any portion around the long hole including a portion on the expanded portion of the upper surface plate. The travel motor hydraulic pipe can be held at a predetermined portion in the long hole by the piping support attached to the support attachment unit. Thus, the pipe can be prevented from being damaged by friction with an edge of the long hole and the like.

In the invention according to claim 3, the long hole is formed in the upper surface plate along the expanded portion formed by expanding the upper surface plate of the travel frame toward the side of the vehicle center. Thus, the cover attachment unit of the piping cover can be provided at any portion around the long hole including a portion on the expanded portion of the upper surface plate. The expanded portion of the upper surface plate can block the obstacle such as a rock protruding upward from below and thus can protect the piping cover. The piping cover is attached over the center frame positioned above the travel frame and the cover attachment unit on the upper surface plate of the travel frame. Thus, the entire piping cover is positioned above the upper surface plate of the travel frame. All things considered, the piping cover can be prevented from colliding with the obstacle such as a rock at a portion other than the expanded portion.

In the invention according to claim 4, in the working machine, in which the working apparatus is mounted on the vehicle, the risk that the travel motor hydraulic pipe and the piping cover collide with the obstacle such as a rock when the working machine travels can be reduced. Furthermore, the operation for assembling the travel motor hydraulic pipe can be easily performed. Thus, with the expanded portion, the long hole required for the pipe routing can be secured without lowering the rigidity of the travel frame. The expanded portion can block the obstacle such as a rock protruding upward from below, and thus can prevent the travel motor hydraulic pipe and the piping cover from being damaged. With the long hole, the pipe routing enabling the travel motor hydraulic pipe to be smoothly routed from the center frame to the travel motor attachment unit can be secured.

BEST MODE FOR CARRYING OUT THE INVENTION

The present invention is described below in detail based on an embodiment shown in FIGS. 1 to 5.

Figure 5:
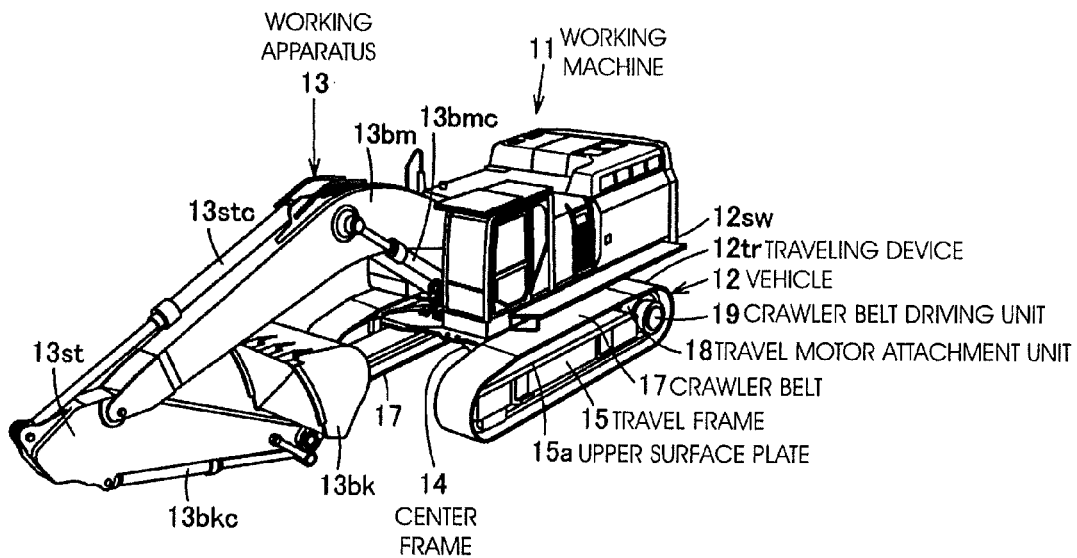
FIG. 5 is a perspective view showing an embodiment of a working machine according to the present invention.
Figure 6:
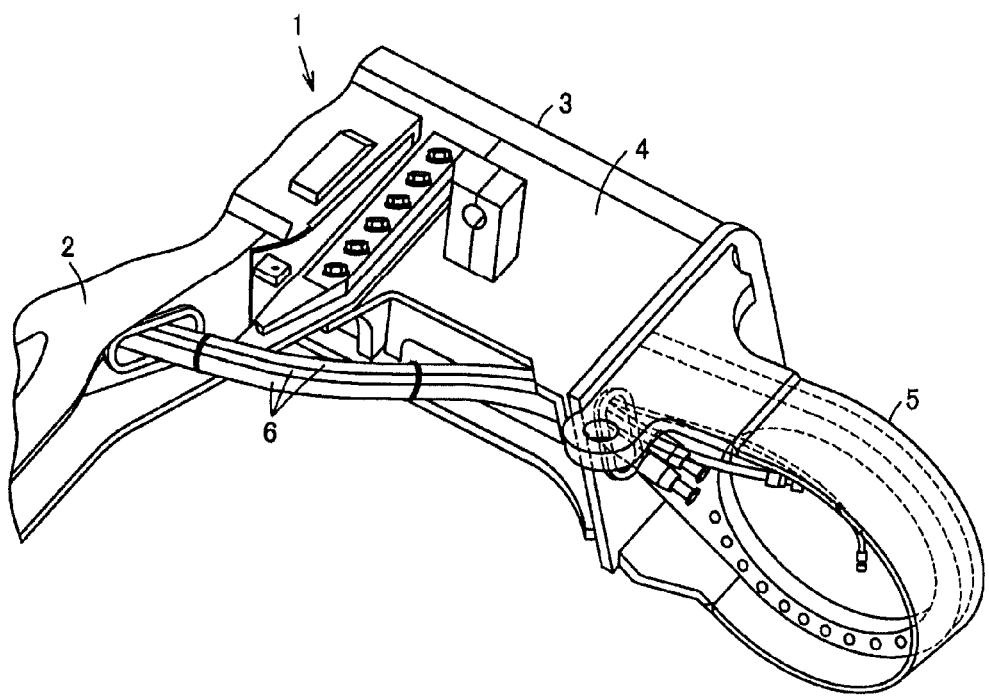
FIG. 6 is a perspective view showing a conventional travel motor hydraulic pipe.

FIG. 5 shows a hydraulic shovel as a working machine 11. The working machine 11 includes a vehicle 12 and a working apparatus 13. In the vehicle 12, an upper swiveling body 12$sw$ is disposed on a traveling device 12$tr$ at a lower portion in such a manner as to be capable of swiveling through a swivel bearing. The working apparatus 13 is mounted on the upper swiveling body 12$sw$ of the vehicle 12. In the working apparatus 13, a stick 13$sty$ that is rotated by a stick cylinder 13$stc$ is coupled to a distal end portion of a boom 13$bm$ that is rotated in an up and down direction by a boom cylinder 13$bmc$. A bucket 13$bk$ that is rotated by a bucket cylinder 13$bkc$ is coupled to a distal end portion of the stick 13$st$.

Figure 1:
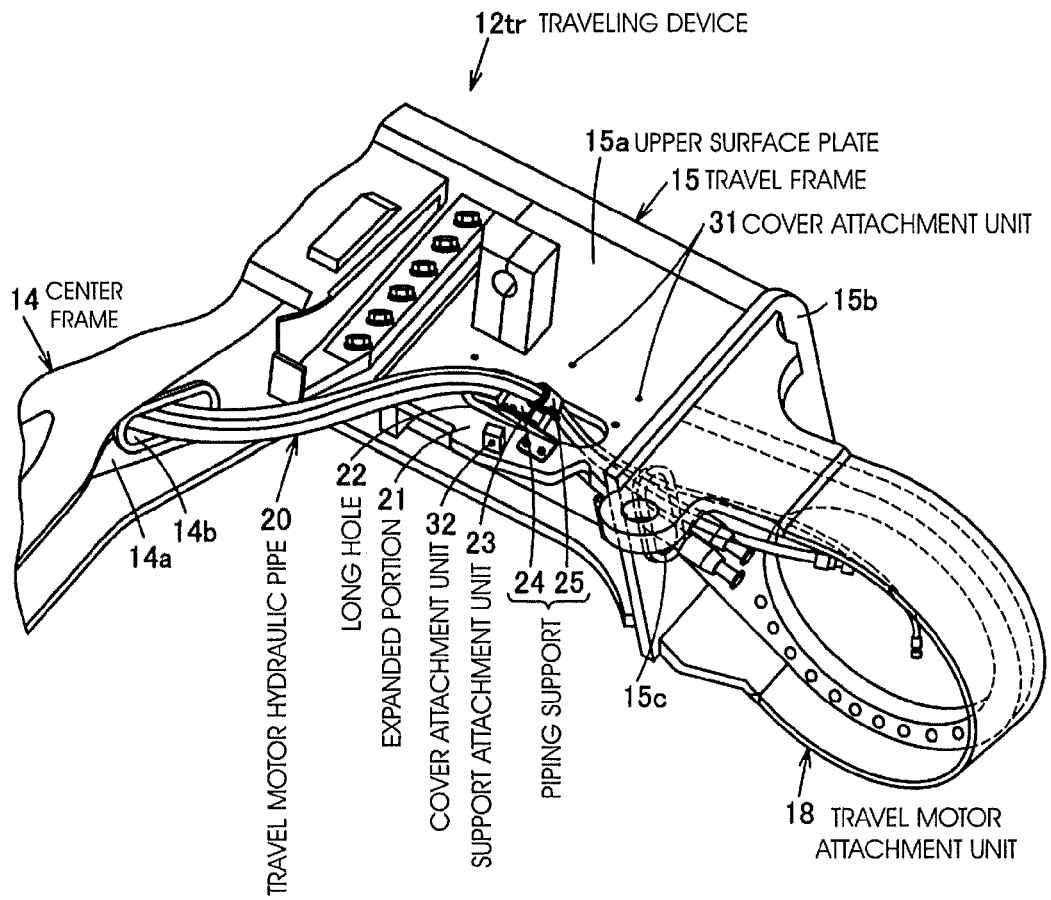
FIG. 1 is a perspective view showing an embodiment of a main part of a traveling device according to the present invention.

The traveling device 12$tr$ at the lower portion includes a center frame 14, travel frames (what is known as truck frames) 15, crawler belts 17, travel motor attachment units 18, crawler belt driving units 19, and a travel motor hydraulic pipe 20. The center frame 14 is positioned at a vehicle center as shown in FIG. 5. The travel frames 15 include upper surface plates 15$a$ and are integrally provided on a lower side of the center frame 14 and on both left and right sides of the center frame 14. The crawler belt 17 is attached along the travel frame 15. The travel motor attachment unit 18 is integrally provided on one end side (vehicle rear end side) of the travel frame 15. The crawler belt driving units 19 drive the left and right crawler belts 17 to rotate, by using hydraulic travel motors respectively attached to the travel motor attachment units 18. As shown in FIG. 1, the travel motor hydraulic pipe 20 is arranged from the center frame 14 to the hydraulic travel motor of the crawler belt driving unit 19 through the travel frame 15.

The crawler belt driving unit 19 includes the hydraulic travel motor, a reducing mechanism unit that is connected to an output shaft of the motor and reduces a motor rotation speed, and a sprocket driven by the reducing mechanism unit. The crawler belt driving unit 19 drives the crawler belt 17 to rotate by using the sprocket.

The travel motor hydraulic pipe 20 is connected to a control valve (not shown) through a swivel joint (not shown) disposed at a swivel center of the center frame 14. The control valve is mounted on the upper swiveling body 12sw. Hydraulic oil is supplied to the control valve from a hydraulic pump (not shown) driven by an engine (not shown) mounted on the upper swiveling body 12sw. The control valve controls the hydraulic oil to be supplied to the hydraulic travel motors of the left and right crawler belt driving units 19 and the like.

Figure 2:
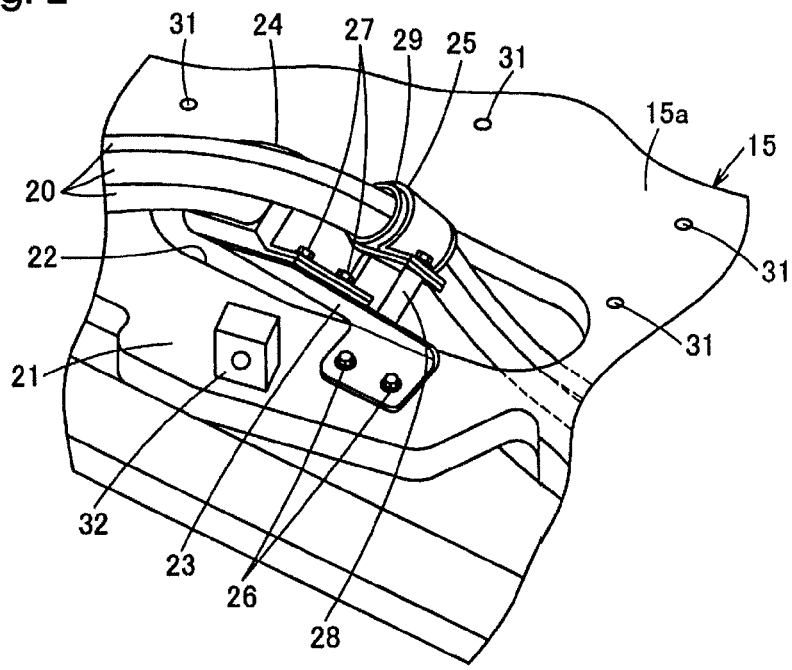
FIG. 2 is an enlarged perspective view of the main part of the traveling device.

As shown in FIGS. 1 and 2, the traveling device 12tr includes an expanded portion 21 and a long hole 22. The expanded portion 21 is formed by expanding the upper surface plate 15a of the travel frame 15, positioned between the center frame 14 and the travel motor attachment unit 18, toward the vehicle center side. The long hole 22 is formed in the upper surface plate 15a of the travel frame 15, along the expanded portion 21. The travel motor hydraulic pipe 20 is inserted through the long hole 22.

As shown in FIG. 1, the travel motor hydraulic pipe 20 is routed from a routing hole 14b formed in an end surface plate 14a of the center frame 14, passes through the long hole 22 in the upper surface plate 15a and a long hole 15c formed in an end surface plate 15b, and is inserted into the travel motor attachment unit 18.

Support attachment units 23 are provided around the long holes of the upper surface plates 15a and the travel frames 15, on the expanded portions 21 for example. Two types of piping supports 24 and 25 for holding the travel motor hydraulic pipe 20 located in the long hole 22 are attached to the support attachment units 23.

As shown in FIG. 2, the support attachment unit 23 is an attachment that has an inclined plate shape and is fixed on the expanded portion 21 by screws 26. The piping support 24 is a piping holding member that is fixed on the support attachment unit 23 by screws 27. The piping support 25 is a piping holding member that has a tubular shape and is fixed on the support attachment unit 23 by a stay 28. The piping support 25 holds the pipe with a buffer material 29 provided in between.

The travel motor hydraulic pipe 20 inserted through the long hole 22 is fixed by the piping supports 24 and 25 so that the travel motor hydraulic pipe 20 is held upward toward a vehicle upper side in the long hole portion of the travel frame 15. Thus, the travel motor hydraulic pipe 20 can be connected to the swivel joint of the center frame 14 while being arranged at a position above the upper surface plate 15a of the travel frame 15.

Figure 3:
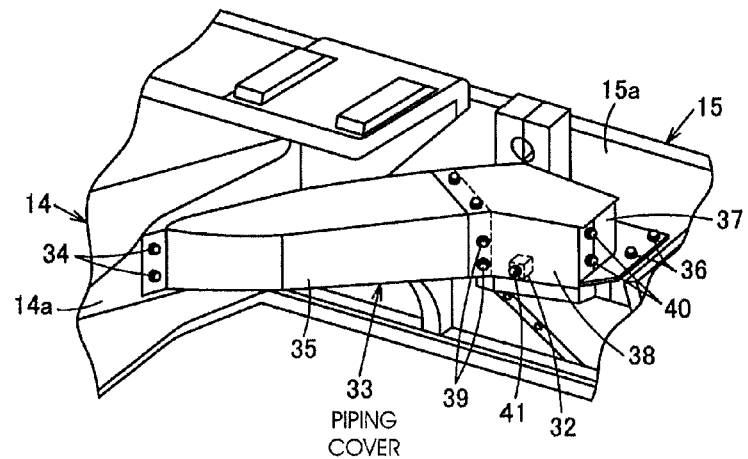
FIG. 3 is a perspective view showing a piping cover of the traveling device.
Figure 4:
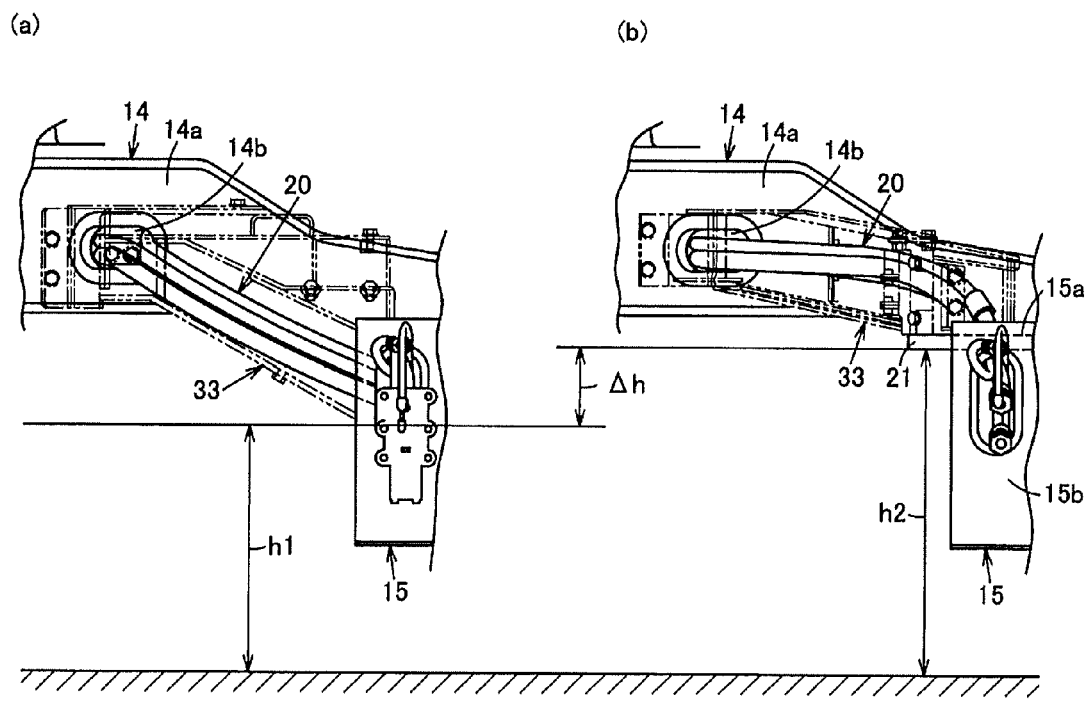
FIG. 4 is a front view showing comparative examples of a piping ground clearance of the traveling device, in which (a) shows a conventional example and (b) shows an example where the present invention is applied.

As shown in FIG. 2, a plurality of attachment holes 31 and attachment blocks 32 as cover attachment units, are disposed around the long hole of the upper surface plate 15a of the travel frame 15. The attachment holes 31 and the attachment blocks 32 are used to attach a piping cover 33 in accordance with the travel motor hydraulic pipe 20 from the end surface plate 14a of the center frame 14 to the upper surface plate 15a of the travel frame 15 as shown in FIG. 3. The piping cover 33 protects the travel motor hydraulic pipe 20.

The piping cover 33 includes a cover member 35, a cover member 37, and a cover member 38. The cover member 35 is fixed on the end surface plate 14a of the center frame 14 by bolts 34. The cover member 37 is fixed on the upper surface plate 15a of the travel frame 15 by bolts 36 screwed into the attachment holes 31 of the upper surface plate 15a. The cover member 38 is provided between the cover members 35 and 37. The cover member 38 is fixed between the cover members 35 and 37 by bolts 39 and 40 and is fixed on the attachment block 32 by a bolt 41.

Operational effects provided by the configuration of the embodiment are described below.

The travel frame 15 including the upper surface plate 15a is integrally provided on the lower side of the center frame 14. The expanded portion 21 is formed by expanding the upper surface plate 15a of the travel frame 15, positioned between the center frame 14 and the travel motor attachment unit 18 integrally provided on one end side of the travel frame 15, toward the side of the vehicle center. The long hole 22, through which the travel motor hydraulic pipe 20 is inserted, is formed on the upper surface plate 15a of the travel frame 15 along the expanded portion 21. Thus, a minimum ground clearance of the piping cover 33 and the travel motor hydraulic pipe 20 routed into the travel frame 15 from the center frame 14 can be changed by a difference $\Delta h$ from a conventional height h1 shown in FIG. 4(a) to a height h2 of the upper surface plate 15a of the travel frame 15 as shown in FIG. 4(b).

As a result, the travel motor hydraulic pipe 20 is less likely to collide with an obstacle such as a rock. A traveling device can be provided that does not employ a structure where the travel motor hydraulic pipe 20 is disposed through a hose insertion space arranged from the inside of the center frame 14 to the inside of the travel frame 15. In the traveling device, an operation for assembling the travel motor hydraulic pipe 20 can be easily performed in an open space between the center frame 14 to the long hole 22 formed in the upper surface plate 15a of the travel frame 15.

When the travel motor hydraulic pipe 20 is inserted through the upper surface plate 15a, a configuration of using a notched groove instead of the long hole 22 is more simple and common. When the notched groove is employed, the travel frame 15 might have a lower rigidity. Thus, the expanded portion 21 is formed by expanding the upper surface plate 15a of the travel frame 15 toward the side of the vehicle center, and the long hole 22 is formed in the upper surface plate 15a of the travel frame 15, along the expanded portion 21. All things considered, with the expanded portion 21, a piping space required for pipe routing, that is, the long hole 22, can be secured without lowering the rigidity of the travel frame 15.

The expanded portion 21 of the upper surface plate 15a can block the obstacle such as a rock protruding upward from below, and thus can protect the travel motor hydraulic pipe 20 and the piping cover 33.

Specifically, the piping cover 33 is formed of a plate thinner than the upper surface plate 15a of the travel frame 15, but the thicker and more rigid expanded portion 21 of the upper surface plate 15a on the lower side of the piping cover 33 is the minimum ground clearance portion. Thus, the expanded portion 21 of the upper surface plate 15a can protect the piping cover 33 and the like from the obstacle below the vehicle.

With the long hole 22 formed along the expanded portion 21 positioned between the center frame 14 and the travel motor attachment unit 18, the pipe routing can be secured that enables the travel motor hydraulic pipe 20 routed from the center frame 14 to be smoothly routed diagonally toward the travel motor attachment unit 18.

The long hole 22 is formed in the upper surface plate 15a, along the expanded portion 21 formed by expanding the upper surface plate 15a of the travel frame 15 toward the side of the vehicle center. The support attachment unit 23 for the piping supports 24 and 25 that hold the travel motor hydraulic pipe 20 located in the long hole 22 and the plurality of attachment hole 31 and attachment blocks 32 as the cover attachment unit for the piping cover 33 can be disposed at any portion around the long hole including a portion on the expanded portion 21 of the upper surface plate 15a.

The travel motor hydraulic pipe 20 can be held at a predetermined portion in the long hole 22 by the piping support 24 and 25 attached to the support attachment unit 23. Thus, the piping 20 can be prevented from being damaged by friction with an edge of the long hole 22.

The piping cover 33 is attached from the center frame 14 positioned above the travel frame 15 to the plurality of attachment hole 31 and attachment blocks 32 formed on the upper surface plate 15a of the travel frame 15. Thus, the entire piping cover 33 is positioned above the upper surface plate 15a of the travel frame 15. All things considered, the piping cover 33 can be prevented from colliding with the obstacle such as a rock at a portion other than the expanded portion 21.

In the working machine 11, in which the working apparatus 13 is mounted on the vehicle 12, the risk that the travel motor hydraulic pipe 20 and the piping cover 33 collide with the obstacle such as a rock when the working machine 11 travels can be reduced. Furthermore, the operation for assembling the travel motor hydraulic pipe 20 can be easily performed.

As described above, the travel motor hydraulic pipe 20 and the piping cover 33 are attached at positions above the upper surface plate 15a of the travel frame 15. Thus, the minimum ground clearance can be as high as the position of the upper surface plate 15a of the travel frame 15, also in a design where the travel motor hydraulic pipe 20 is not disposed through the hose insertion space in the traveling device. Thus, the risk that the travel motor hydraulic pipe 20 and the piping cover 33 collide with the obstacle such as a rock can be reduced. The operation for assembling the travel motor hydraulic pipe 20 can be easily performed. With the expanded portion 21 of the upper surface plate 15a, the long hole 22 required for pipe routing can be secured without lowering the rigidity of the travel frame 15. The expanded portion 21 can block the obstacle protruding upward from below, and can prevent the travel motor hydraulic pipe 20 and the piping cover 33 from being damaged. The long hole 22 further provides an effect of securing the pipe routing enabling the travel motor hydraulic pipe 20 routed from the center frame 14 to be smoothly routed toward the travel motor attachment unit 18, and the like.

INDUSTRIAL APPLICABILITY

The present invention has industrial applicability for companies involved in manufacturing and selling of traveling devices or working machines.

EXPLANATION OF REFERENCE NUMERALS 11 working machine
12 vehicle
12tr traveling device
13 working apparatus
14 center frame
15 travel frame
15a upper surface plate
17 crawler belt
18 travel motor attachment unit
19 crawler belt driving unit
20 travel motor hydraulic pipe
21 expanded portion
22 long hole
23 support attachment unit
24, 25 piping support
31 attachment hole as cover attachment unit
32 attachment block as cover attachment unit
33 piping cover

The invention claimed is:

1. A traveling device for a vehicle, comprising:
   a center frame positioned at a center of the vehicle;
   a travel frame including an upper surface plate integrally provided on a lower side of the center frame;
   a crawler belt coupled to the travel frame;
   a travel motor attachment unit integrally provided on one end side of the travel frame;
   a hydraulic travel motor attached to the travel motor attachment unit; and
   a hydraulic pipe extending from the center frame to the hydraulic travel motor through the travel frame, the traveling device further comprising:
     an expanded portion formed by extending the upper surface plate of the travel frame from the center frame towards the travel motor attachment unit;
     a hole formed in the expanded portion of the upper surface plate through which the hydraulic pipe is inserted, the hole having a length and a width, and the length being longer than the width;
     a plurality of support members attached to the expanded portion of the upper surface plate proximate the hole, the plurality of support members supporting the hydraulic pipe such that a length of the hydraulic pipe enters the hole inclined with respect to a plane formed by the hole; and
     a cover member that encloses the hydraulic pipe between the center frame and the hole.

2. The traveling device according to claim 1, wherein at least one support member of the plurality of support members is inclined with respect to the plane formed by the hole.

3. The traveling device according to claim 1, further comprising:
   a cover attachment unit disposed around the hole of the upper surface plate of the travel frame, the cover attachment unit supporting the cover member.

4. The traveling device of claim 1, further including a working apparatus mounted on the vehicle.

5. The traveling device according to claim 4, wherein the working apparatus is a hydraulic shovel.

6. The traveling device according to claim 1, wherein the center frame extends axially along a length of the vehicle, and the travel frame extends from the center frame towards a side of the vehicle.

7. The traveling device according to claim 1, wherein the length of the hole extends along a length of the upper surface plate.

8. The traveling device according to claim 7, wherein the hole extends completely through a thickness of the upper surface plate.

9. The traveling device according to claim 8, wherein the hydraulic pipe extends from one side of the upper surface plate to an opposite side of the upper surface plate through the hole.

10. A traveling device for a vehicle, comprising:
   a center frame extending along a center of the vehicle;
   a travel frame extending from a bottom surface of the center frame towards a side of the vehicle, the travel frame including an upper surface plate that forms a top surface of the travel frame, the upper surface plate including a hole extending therethrough;
   a crawler belt coupled to the travel frame;
   a travel motor attachment unit provided on an end of the travel frame;
   a hydraulic travel motor attached to the travel motor attachment unit, the hydraulic travel motor being configured to drive the crawler belt; and
   a hydraulic pipe extending from the center frame to the hydraulic travel motor through the travel frame, wherein the hydraulic pipe extends from a top side of the upper surface plate to a bottom side of the upper surface plate through the hole;
   at least one support member attached to the upper surface plate proximate the hole, the at least one support member supporting the hydraulic pipe such that a length of the hydraulic pipe enters the hole inclined with respect to a plane formed by the hole; and
   a cover member that encloses the hydraulic pipe between the center frame and the hole.

11. The traveling device of claim 10, further including a cover attachment unit attached to the upper surface plate proximate the hole, the cover attachment unit supporting the cover member.

12. The traveling device according to claim 10, wherein the at least one support member is inclined with respect to the plane of the hole.

* * * * *